United States Patent
Cai et al.

(10) Patent No.: US 11,526,356 B2
(45) Date of Patent: Dec. 13, 2022

(54) PREFETCH MECHANISM FOR A CACHE STRUCTURE

(71) Applicant: Arm Limited, Cambridge (GB)

(72) Inventors: Lingzhe Cai, Austin, TX (US); Krishnendra Nathella, Austin, TX (US); Jaekyu Lee, Austin, TX (US); Dam Sunwoo, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/887,442

(22) Filed: May 29, 2020

(65) Prior Publication Data
US 2021/0373889 A1 Dec. 2, 2021

(51) Int. Cl.
*G06F 9/30* (2018.01)
*G06F 9/38* (2018.01)
*G06F 9/54* (2006.01)
*G06F 12/0862* (2016.01)
*G06F 12/1027* (2016.01)
*G06F 9/52* (2006.01)

(52) U.S. Cl.
CPC ...... *G06F 9/30047* (2013.01); *G06F 9/30079* (2013.01); *G06F 9/3806* (2013.01); *G06F 9/522* (2013.01); *G06F 9/544* (2013.01); *G06F 12/0862* (2013.01); *G06F 12/1027* (2013.01); *G06F 2212/7201* (2013.01)

(58) Field of Classification Search
CPC .................................................. G06F 9/30047
See application file for complete search history.

(56) References Cited

U.S. PATENT DOCUMENTS

| | | | | |
|---|---|---|---|---|
| 9,535,696 | B1* | 1/2017 | Gschwind | G06F 9/30047 |
| 2014/0297965 | A1* | 10/2014 | Jayaseelan | G06F 12/0862 711/137 |
| 2014/0310478 | A1* | 10/2014 | Dodson | G06F 12/0862 711/137 |
| 2014/0317356 | A1* | 10/2014 | Srinivasan | G06F 12/0844 711/137 |
| 2016/0034023 | A1* | 2/2016 | Arora | G06F 1/3206 711/137 |

(Continued)

OTHER PUBLICATIONS

Ferdman et al., "Proactive Instruction Fetch", Proceedings of the International Symposium on Microarchitecture, Dec. 3-7, 2011, 11 pages.

(Continued)

*Primary Examiner* — Michael J Metzger
(74) *Attorney, Agent, or Firm* — Nixon & Vanderhye P.C.

(57) ABSTRACT

An apparatus and method is provided, the apparatus comprising a processor pipeline to execute instructions, a cache structure to store information for reference by the processor pipeline when executing said instructions; and prefetch circuitry to issue prefetch requests to the cache structure to cause the cache structure to prefetch information into the cache structure in anticipation of a demand request for that information being issued to the cache structure by the processor pipeline. The processor pipeline is arranged to issue a trigger to the prefetch circuitry on detection of a given event that will result in a reduced level of demand requests being issued by the processor pipeline, and the prefetch circuitry is configured to control issuing of prefetch requests in dependence on reception of the trigger.

17 Claims, 12 Drawing Sheets

(56) References Cited

U.S. PATENT DOCUMENTS

2017/0286116 A1\* 10/2017 Johar ............... G06F 9/3804
2018/0165204 A1\* 6/2018 Venkatesh ........ G06F 9/30047
2018/0181402 A1\* 6/2018 Zhang .............. G06F 9/383

OTHER PUBLICATIONS

Ferdman et al., "Temporal Instruction Fetch Streaming", Proceedings of the International Symposium on Microarchitecture, Nov. 2008, 10 pages.
Kaynak et al., "SHIFT: Shared History Instruction Fetch for Lean-Core Server Processors", Proceedings of the Annual International Symposium on Microarchitecture, Dec. 7-11, 2013, pp. 272-283.
Kolli et al., "RDIP: Return-address-stack Directed Instruction Prefetching", in Proceedings of the Annual International Symposium on Microarchitecture, Dec. 7-11, 2013, pp. 260-271.
Kallurkar et al., "pTask: A Smart Prefetching Scheme for OS Intensive Applications", 2016 49th Annual IEEE/ACM International Symposium on Microarchitecture (MICRO), Oct. 2016, pp. 1-12.
Kumar et al., "Blasting Through the Front-End Bottleneck with Shotgun", In Architectural Support for Programming Languages and Operating Systems (ASPLOS), Mar. 24-28, 2018, 13 pages.
Kaynak et al., "Confluence: Unified Instruction Supply for Scale-Out Servers", In International Symposium on Microarchitecture, Dec. 2015, 12 pages.
Kumar et al., "Boomerang: A Metadata-Free Architecture for Control Flow Delivery", 2017 IEEE International Symposium on High Performance Computer Architecture, HPCA 2017, Feb. 4-8, 2017, 12 pages.
Armstrong et al., "Wrong Path Events: Exploiting Unusual and Illegal Program Behavior for Early Misprediction Detection and Recovery", Proceedings of the 37th ACM/IEEE International Symposium on Microarchitecture, Dec. 4-8, 2004, 10 pages.
Wu et al., "Temporal Prefetching Without the Off-Chip Metadata", MICRO-52, Oct. 12-16, 2019, 13 pages.
Wu et al., "Efficient Metadata Management for Irregular Data Prefetching", ISCA '19, Jun. 22-26, 2019, pp. 449-461.
Nesbit et al., "Data Cache Prefetching Using a Global History Buffer", Proceedings of the Tenth Symposium on High-Performance Computer Architecture, 10 pages, Feb. 2004.
Wenisch et al., "Practical Off-Chip Meta-data for Temporal Memory Streaming," in 15th International Symposium on High Performance Computer Architecture (HPCA), 12 pages, Feb. 14-18, 2009.
Jain et al., "Linearizing Irregular Memory Accesses for Improved Correlated Prefetching," in 46rd Annual IEEE/ACM International Symposium on Microarchitecture (MICRO), 13 pages, Dec. 7-11, 2013.
Bakhshalipour et al., "Domino temporal data prefetcher," 24th IEEE International Symposium on High Performance Computer Architecture (HPCA), pp. 131-142, Feb. 24-28, 2018.
Wenisch et al., "Temporal Streaming of Shared Memory," in Proceedings of the 32nd Annual International Symposium on Computer Architecture (ISCA), Jun. 2005, 12 pages.
Somogyi et al., "Spatio-Temporal Memory Streaming," in Proceedings of the 36th Annual International Symposium on Computer Architecture (ISCA), 12 pages, Jun. 2009.

\* cited by examiner

For I$ Prefetcher

| Instruction ID (401) | Prefetch Control Information (402) | Confidence indication (403) | Valid Bit (404) |
|---|---|---|---|
| PC for SVC | Indication of at least some instructions following the identified instruction | | |
| PC for ERET | | | |
| PC + correlation signature for iSB | | | |
| PC + correlation signature for iSB | | | |
| . . . | . . . | . . . | . . . |
| | | | |

FIG. 4

For iTLB Prefetcher

| Instruction ID | Prefetch Control Information | Confidence indication | Valid Bit |
|---|---|---|---|
| PC for SVC | Indication of at least some instructions following the identified instruction | | |
| PC for ERET | | | |
| PC + correlation signature for iSB | | | |
| PC + correlation signature for iSB | | | |
| . . . | . . . | . . . | . . . |
| | | | |

| Instruction ID | Prefetch Control Information | | | | Confidence indication | Valid Bit |
|---|---|---|---|---|---|---|
| | | For BTB Prefetcher | | | | |
| | PC/offset for taken branch B0 | Target address for B0 | PC/offset for taken branch B1 | Target address for B1 ... | | |
| PC for SVC | | | | | | |
| PC for ERET | | | | | | |
| PC + correlation signature for ISB | | | | | | |
| PC + correlation signature for ISB | | | | | | |
| | | | | | ..... | ..... |

611 — Instruction ID
612 — Prefetch Control Information
613 — Confidence indication
614 — Valid Bit

FIG. 6B

PREFETCH MECHANISM FOR A CACHE STRUCTURE

BACKGROUND

The present technique relates to the field of data processing.

When a processor is performing data processing operations, it will typically need to access information in memory. The information can take a variety of forms, for example the instructions to be executed, and/or the data to be processed. In order to improve access times to the information, it is common to provide one or more levels of cache between the processor and memory, to cache a subset of the information in memory for access by the processor. These caches however have a limited capacity, and in order to maximise the performance benefit obtainable from such caches it is desirable to increase the hit rate in such caches (a hit occurring when the information requested by the processor is present in the cache).

Prefetch circuitry may therefore be provided to seek to populate a cache structure with information in advance of the processor issuing a demand request for that information. In response to a prefetch request the cache structure seeks to retrieve the requested information from a lower level cache or main memory, and if the information is retrieved early enough this means that it will be available in the cache structure for use in connection with a subsequently received demand request for that information, increasing performance of the processor by reducing access times to the required information.

Whilst a cache structure can respond to prefetch requests from the prefetch circuitry, it also needs to handle the demand requests being issued by the processor. Typically the cache structure will need to prioritise the demand requests over the prefetch requests in order to ensure that there is no undue delay in handling the processor's requests. However, it is also desirable to ensure that prefetch requests can be processed in a timely manner in order that the prefetching activity can result in retrieval of information early enough to improve the performance of handling of demand requests for that information from the processor.

SUMMARY

Viewed from a first aspect, the present technique provides an apparatus, comprising: a processor pipeline to execute instructions; a cache structure to store information for reference by the processor pipeline when executing said instructions; and prefetch circuitry to issue prefetch requests to the cache structure to cause the cache structure to prefetch information into the cache structure in anticipation of a demand request for that information being issued to the cache structure by the processor pipeline; wherein: the processor pipeline is arranged to issue a trigger to the prefetch circuitry on detection of a given event that will result in a reduced level of demand requests being issued by the processor pipeline; and the prefetch circuitry is configured to control issuing of prefetch requests in dependence on reception of the trigger.

Viewed from a second aspect, the present technique provides a method of controlling prefetching in an apparatus, the method comprising: employing a processor pipeline to execute instructions; storing information in a cache structure for reference by the processor pipeline when executing the instructions; issuing prefetch requests to the cache structure to cause the cache structure to prefetch information into the cache structure in anticipation of a demand request for that information being issued to the cache structure by the processor pipeline; issuing from the processor pipeline a trigger on detection of a given event that will result in a reduced level of demand requests being issued by the processor pipeline; and controlling the issuing of prefetch requests in dependence on reception of the trigger.

Viewed from another aspect, the present technique provides an apparatus, comprising: processing means for executing instructions; cache means for storing information for reference by the processing means when executing said instructions; and prefetch means for issuing prefetch requests to the cache means to cause the cache means to prefetch information into the cache means in anticipation of a demand request for that information being issued to the cache means by the processing means; wherein: the processing means is arranged to issue a trigger to the prefetch means on detection of a given event that will result in a reduced level of demand requests being issued by the processing means; and the prefetch means is configured to control issuing of prefetch requests in dependence on reception of the trigger.

Further aspects, features and advantages of the present technique will be apparent from the following description of examples, which is to be read in conjunction with the accompanying drawings.

BRIEF DESCRIPTION OF THE DRAWINGS

The present technique will be described further, by way of illustration only, with reference to examples thereof as illustrated in the accompanying drawings, in which:

FIG. 4 shows an example of prefetch pattern storage used within prefetch circuitry for instruction cache prefetch;

FIG. 6A shows an example of prefetch pattern storage used within prefetch circuitry for instruction Translation Lookaside Buffer prefetch;

FIG. 6B shows an example of prefetch pattern storage used within prefetch circuitry for Branch Target Buffer prefetch;

DESCRIPTION OF EXAMPLES

Figure 1:
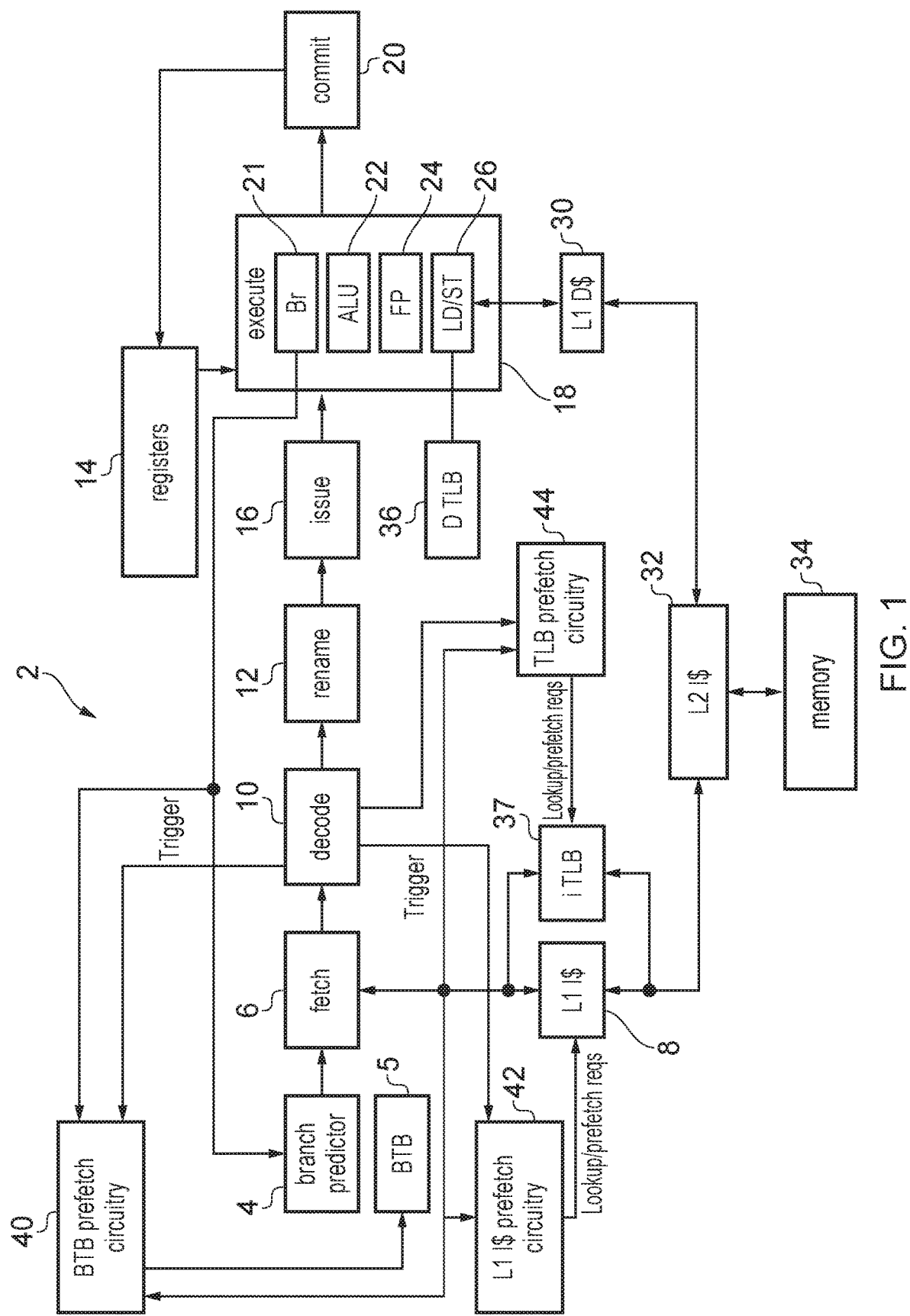
FIG. 1 schematically illustrates an example of a data processing apparatus including a processor pipeline.

Some specific examples are shown below. It will be appreciated that the invention is not limited to these examples.

As discussed above, when a processor is performing data processing operations, it will typically need to access information from memory. For example, it may need to fetch instructions from memory for execution, and may need to read data from, and write data to, memory during performance of the data processing operations. Often cache structures may be provided to temporarily store a subset of the information, so as to improve access times to such information and hence increase overall performance. The cache structures can be referenced by a variety of components of the processor. For instance, the processor may be formed of multiple stages arranged in a pipelined manner, including for example a fetch stage towards the front end of the pipeline that is used to fetch instructions for execution. One or more cache structures may be used by the front end stages of the pipeline, and may be referred to herein as front end cache structures. As examples of front end cache structures, an instruction cache may be used to cache instructions, an instruction translation lookaside buffer (iTLB) may be used to cache translation information obtained from page tables in memory, and used to translate virtual addresses issued by the processor to physical addresses used by the memory, a branch target buffer (BTB) may be used to indicate target addresses for taken branch instructions for use by the fetch stage when determining what instructions to fetch, etc. Whilst herein the present technique will be described with reference to such front end cache structures, the technique is not limited to such use, and could for instance be used in association with cache structures referenced by later components of the processor pipeline, for example a load/store unit used to load data from, and store data to memory. In such instances the cache structures may for example be a data cache used to cache data, a data TLB (dTLB) used to store virtual to physical address translation information, etc.

Considering the earlier-mentioned fetch stage, this can be arranged to fetch instructions from a hierarchy of caches, and ultimately from main memory. Fetching takes time, and the further from the pipeline the cache is that holds the instruction required, the longer the fetch typically takes. Lower level caches and memory structures such as those shared with other processing devices for example are often physically and logically further from the processor pipeline. Accesses therefore take more clock cycles to complete and return the desired information. It is thus preferable for the fetch circuitry to obtain information from a higher level cache, such as the cache first referred to by the processor pipeline. This could be a level 1 instruction cache (L1 i$) for example. However, these structures often have limited capacity in order to improve access times. It is therefore desirable to provide a method of populating, in the cache structures, information which will subsequently be needed by the processor. A prefetcher may be provided to seek to achieve this. Whilst a prefetcher could be used in association with any level of cache in a cache hierarchy, its efficient use in association with the higher level of caches is particularly beneficial as if the prefetcher is able to reliably populate such a cache with information before it is required by the processor this will significantly increase the hit rate in the cache and enable demand requests from the processor to be serviced without the performance impact of needing to access lower levels of cache and/or main memory.

For example, when the fetch stage performs a fetch operation by issuing a demand request, then it is highly beneficial if the instruction or instructions being requested is/are available in that closest cache, rather than having to propagate the fetch request on to lower levels of cache and/or main memory. A prefetch is therefore most effective when done early enough so that the L1 cache is populated with the required information before the fetch stage makes the request for that information. However, as long as the prefetch request is made before the corresponding demand fetch request from the processor this can still save fetching time. Even if the prefetch is incomplete when the demand fetch request is issued, the information requested by the processor may still be returned to the processor sooner than if no prefetch request were made.

There are various techniques that may be used by prefetch circuitry to determine what information to prefetch. For example the prefetch circuitry may seek to predict from analysis of a sequence of demand accesses to a particular cache structure by the processor, what information will subsequently be requested by the processor and then seek to prefetch that information. In some examples, prefetching is performed when it is predicted that a piece of information will be needed and there was a miss in the corresponding cache structure the last time it was required. In addition, the prefetch may also be required when the piece of information was successfully prefetched the last time it was required, that is, there would have been a miss in the cache if not for the prefetch. A balance should be achieved between prefetching enough information to be effective and too much to fill the cache or overwhelm it with requests.

However, a cache structure with associated prefetch circuitry will receive both prefetch requests from the prefetch circuitry and demand requests from the processor pipeline, and this can lead to a restriction on the level of prefetching that can be performed. Typically priority will be given to the demand requests since they represent the information actually required to be accessed whereas the prefetch requests represent a prediction of future information required to be accessed. However, if the prefetch requests are throttled back too much, the effectiveness of prefetching is likely to be compromised, leading to a reduction in performance due to an increased level of missing in the cache. The techniques described herein aim to alleviate this issue.

In particular, the present technique causes the pipeline to issue a trigger to the prefetch circuitry when it detects an event likely to cause a reduced level of demand requests, and this information is used to influence the prefetching activities of the prefetch circuitry. There are various events that could be used. For instance the processor pipeline may support execution of instructions which cause the pipeline to be flushed, and if their presence can be detected before the flush actually takes place this can be used to free up some time for prefetching rather than processing demand requests. The instructions may for example causes changes in exception level of the processor pipeline, and the pipeline may be flushed in order that information does not leak between the exception levels. This may for example be done to ensure that applications do not have access to the information accessible to the operating system. As another example, barrier instructions may be added to act as a point of synchronisation, ensuring that all instructions preceding the barrier instruction are completed and their results committed before any subsequent instructions after the barrier instruction are handled, with execution of the barrier instruction causing any such subsequent instructions already fetched to be flushed from the pipeline. As another example, when a branch misprediction is made, then ultimately at the time that branch instruction is executed the misprediction will be detected and the pipeline will need to be flushed. In some instances events may be detected that are indicative of such a wrong execution path being followed, allowing an early indication of a likely future flush of the pipeline. The detection of the above-mentioned events can be used to indicate that there is likely to be drop in demand requests from the pipeline, due to the need to flush the pipeline before ref etching of instructions for execution is resumed, and this can be used to change the behaviour of the prefetch circuitry in the interim.

The processing apparatus of the present technology includes a processor pipeline to execute instructions. An example is shown in FIG. 1, discussed in more detail below. It will be appreciated that the processor pipeline may be part of a larger processing device which may include other components not described herein for conciseness.

A cache structure stores information for reference by the processor pipeline when executing said instructions. Examples of the cache structure include front end caches such as an instruction cache (i$), a branch target buffer (BTB) and instruction translation lookaside buffer (iTLB) for example. However it will be appreciated that the present technique could be applied to any cache for which prefetching can be usefully applied. In one example implementation, the cache structure is one that is close to and easily accessible by the processor pipeline. The cache itself may hold information such as instructions, address translations or branch information. The cache structure can be arranged in accordance with any of a number of known techniques, and hence a detailed description of the cache structure is not included herein.

The prefetch circuitry issues prefetch requests to the cache structure to cause the cache structure to prefetch information into the cache structure in anticipation of a demand request for that information being issued to the cache structure by the processor pipeline. The prefetch circuitry may use a training algorithm to determine the sequence of information that is likely to be needed by the processor pipeline. The exact detail of this algorithm is therefore a design choice dependent on the system, although a discussion of an example training technique will be discussed later with reference to FIG. 7.

In one example implementation the technique described herein may be employed in respect of a single cache structure within the data processing apparatus. However, if desired, multiple instances of the prefetch circuitry may be provided for each of several cache structures accessed by the processor pipeline. Alternatively, one instance may be provided that issues prefetch requests pertaining to more than one cache structure.

The processor pipeline is arranged to issue a trigger to the prefetch circuitry on detection of a given event that will result in a reduced level of demand requests being issued by the processor pipeline. Using an event that signals a reduced level of fetch demand has two advantages. Firstly, that reduced level of demand from the processing pipeline allows the prefetch circuitry to increase its prefetching activity in order to more quickly and efficiently populate the relevant cache structure with the required information. This is at least in part because demand requests (being processing critical) are often prioritised over prefetch requests. Thus using a trigger as defined here, the prefetch circuitry can take advantage of the anticipated drop in demand requests to increase prefetching. Whilst it may for example wait for the actual drop in prefetch requests to occur before doing this, in another example implementation it may be possible to increase the prefetching activities before that point is reached. For example, considering demand requests to the instruction cache, that take the form of instruction fetch requests from fetch circuitry of the processor pipeline, if the event detected is indicative of an impending flush of the pipeline, the instruction cache could be arranged to give increased priority to prefetch requests/reduce the priority of demand requests following issuance of the trigger, since it is expected that the instructions fetched in response to the demand fetch requests will in any event be flushed.

Secondly, these events which signal that there will be reduced demand may also be used to provide a good indication of the information that should be prefetched into the cache. For example, certain instructions can suggest the pattern of instructions that follow them. The prefetch circuitry is thus configured to control issuing of prefetch requests in dependence on reception of the trigger. This might be in terms of timing, degree or content of the prefetch.

In at least one example of the present technique, the prefetch circuitry controls a degree of prefetching in dependence on the trigger. The degree of prefetching is the amount of information (for example represented by the number of prefetch requests) that the prefetch circuitry seeks to prefetch in response to a prefetch trigger. This can also be described as the agressivity of prefetching. The number of pieces of information that can be prefetched might typically depend on how confident the prefetch controller is that the information will be needed by the processor pipeline. The prefetch requests may be limited by the number of requests being made by the fetch circuitry on the same cache. The prefetch circuitry according to the present technique can respond to the abovementioned triggers differently from other stimulus by changing the degree of prefetching, for example for a predetermined time period following issuance of that trigger.

The prefetch circuitry may, for example, increase the degree of prefetching upon receipt of the trigger. When the prefetch circuitry receives the trigger from the processor pipeline, indicating that there will be a period of reduced demand on the cache from the processor pipeline, it can correspondingly increase the rate of requests issued from the prefetch circuitry, thus increasing the rate at which information is prefetched in response to such a stimulus, and hence prefetching more aggressively. This increase may, for example, be a one-time event, increasing the number of pieces of information that are prefetched in response to the trigger, in comparison to the degree that would be prefetched in response to another trigger for example. This may be implemented by populating a prefetch buffer within the prefetch circuitry with an indication of the information to be prefetched. When the trigger is received, the prefetch circuitry can increase the degree of prefetching by increasing the contents of the prefetch buffer to ensure that there is a sufficient amount of information to be prefetched to make optimum use of the window of opportunity for an increased rate of prefetching. When the window of opportunity has passed, the degree of prefetching than then be scaled back to its usual level.

It should be noted that the above-mentioned trigger that is issued when there is an anticipated reduction in demand requests from the processor pipeline may be used in combination with any existing triggers that the prefetch circuitry may receive to cause it to perform prefetching, and the prefetch circuitry may also respond to those standard triggers in the usual way. Hence the prefetch circuitry may vary the aggressiveness of its prefetching in dependence on what it is getting triggered by.

The given event can take a variety of forms. In some examples, the given event is a given instruction that, when executed, causes the processor pipeline to be emptied prior to resuming fetching of instructions from memory. This is known as a pipeline flush. This means that for a number of cycles, several pipeline stages may be left idle for the duration of the pipeline flush, before being re-populated. For example, this could be due to a mispredicted branch, where the instructions in the pipeline are no longer needed. The fetch circuitry cannot fetch a new instruction for example, until it knows the correct branch target. Whilst the fetch circuitry is idle, it does not make requests for information from the cache structure. An instruction which causes a flush of the pipeline therefore indicates a reduction in demands from the fetch circuitry. Furthermore, if detection of the instruction that will cause the flush can be made prior to that instruction being executed, the trigger can be issued prior to execution of that instruction, enabling the prefetch circuitry to take advantage of the anticipated reduction in demand requests. For example, as discussed earlier, demand requests could be given reduced priority during that intervening period, allowing the increase in the degree of prefetching to occur even before the relevant instruction is executed in order to cause the flush to take place.

In one example implementation, the given instruction may be a commit flush causing instruction that, when executed, causes the processor pipeline to complete execution of instructions occurring before the given instruction in order to commit the results of those instructions, and causes any instructions following the given instruction that have already been fetched from memory to be flushed from the pipeline. Once presence of the commit flush causing instruction has been detected (which as discussed earlier may be at a point earlier than execution of that instruction), this provides the window of opportunity for the prefetch circuitry to increase the degree of prefetching in order to populate the cache with prefetched information. When the commit flush causing instruction is executed, the processor pipeline ensures that all instructions before the commit/flush instruction are fully executed and their results committed (i.e. the state of the processor is updated to reflect those results). In addition, all instructions that have been fetched but that follow the commit/flush instruction are not executed and instead flushed from the pipeline. Nothing more can be fetched until the commit/flush instruction has been fully executed.

The commit flush causing instruction can take a variety of forms, but could be for example an exception entry or exit instruction. These can take various forms, and in some instances only particular types of exception entry or exit instructions may be used for this purpose. In one example implementation, supervisor call (SVC) and/or exception return (ERET) instructions are used as trigger generating instructions for the prefetch circuitry. Such instructions cause a change in exception level, and when entering a different exception level it is necessary for processing state to be saved, and on exit, it can be restored. This protects the state of the system and means that it cannot be changed and or accessed by programs which do not have the appropriate permissions. Another example of a commit flush instruction that may be used as a trigger to the prefetch circuitry is a barrier instruction (also referred to herein as an instruction synchronisation barrier, ISB, instruction) which can be used as a context synchronisation event. In particular, a barrier instruction may be added to act as a point of synchronisation, ensuring that all instructions preceding the barrier instruction are completed and their results committed before any subsequent instructions after the barrier instruction are handled, with execution of the barrier instruction causing any such subsequent instructions already fetched to be flushed from the pipeline. Those subsequent instructions will then need to be ref etched after execution of the ISB instruction has completed.

The prefetch circuitry may take a variety of forms, but in one example implementation comprises prefetch pattern storage having a plurality of entries. Each entry is used to identify a temporal locality exhibiting instruction and prefetch control information used to identify a pattern of demand accesses to the cache structure that occur following that temporal locality exhibiting instruction. By labelling an instruction as a temporal locality exhibiting instruction, this means that the instruction at a given location within a program is a good indicator of the pattern of demand requests that will be made following it, for instance because it can be predicted what sequence of instructions will follow that given instruction. The prefetch storage can therefore use previous instances of such an instruction, to store prefetch control information used to determine the prefetch requests to be made following that instruction.

The prefetch control information can take a variety of forms. For instance, considering the prefetch circuitry associated with an instruction cache, the prefetch control information may identify the addresses of a sequence of instructions that followed the temporal locality exhibiting instruction (or at least a subset of them such as ones that missed in the instruction cache last time) as an indication of what to prefetch the next time the trigger instruction is encountered. The addresses could be specified directly, or by using offset information identifying an offset relative to a base address, e.g. the address of the temporal locality exhibiting instruction. The prefetcher can thus be trained on what would be useful to prefetch. An example of a training algorithm in shown in FIG. 7 described below. It will be appreciated however that any prefetch training method could be applied.

Alternatively, rather than indicating the addresses directly within the prefetch control information, the prefetch control information might instead take the form of a pointer into a global history buffer. That is, the prefetch pattern storage may in such an implementation be considered to provide an index table, with an entry identifying a temporal locality exhibiting instruction and providing a pointer to a corresponding entry in a global history buffer. The global history buffer may be arranged as a circular buffer which records the addresses being accessed on a continuous basis. Having detected a temporal locality exhibiting instruction, the index table can therefore provide the corresponding location in the global history buffer, which can then be referenced to provide addresses of the demand accesses following the temporal locality exhibiting instruction, thus enabling a determination of the information to prefetch into the appropriate cache.

In one example implementation, the given instruction that causes the processing circuitry to issue the trigger may be one of the temporal locality exhibiting instructions having an associated entry in the prefetch pattern storage. The trigger can therefore be used to directly identify the entry in the pattern storage. This provides particular benefits, since not only does the trigger identify that there is an anticipated drop in demand requests from the processor pipeline, but also indicates the information that should be prefetched into the cache structure during the period of time where a higher degree of prefetching can be performed.

The trigger itself may take a variety of forms, but in one example implementation may identify location information indicative of a location of the given instruction in a sequence of instructions. For example, the program counter value (and optionally the type of instruction (ERET, ISB for example) may be supplied to the prefetching circuitry as part of the trigger signal in order to identify where in the program the instruction is. Thus, as discussed above, if the instruction causing the trigger is a temporal locality exhibiting instruction for example, the location within the program can be used to predict what information will be required next. Any other indication of where in the sequence of instructions the given instruction falls could be included in the trigger signal.

In some examples the given instruction has associated therewith multiple different patterns of demand accesses to the cache structure that occur following that given instruction, where each different pattern is associated with a different instance of use of that given instruction within an instruction sequence. The prefetch circuitry can therefore be arranged to obtain a correlation signature associated with the trigger that is used in combination with the program counter value to identify the particular instance of use of the given instruction. The prefetch pattern storage is further arranged to store the correlation signature in association with the prefetch control information used to identify each different pattern of demand accesses to the cache structure identified for that given instruction. As above, whilst the prefetch control information may identify the actual addresses for the pattern of demand accesses, these may alternatively be stored in a global history buffer (GHB), with the prefetch control information providing a pointer into the GHB. The correlation signature may be included in the trigger, along with the program counter value for example, or alternatively it could be determined by the prefetch circuitry from analysing certain state information of the processor pipeline. As a specific example of a correlation signature that may assist in identifying the particular instance of use of the given instruction, the content of a return address stack used by the processor pipeline may provide a useful signature. However, it will be appreciated that any suitable signature could be used.

As an alternative to the above discussed types of given event, or in addition thereto, the given event that causes the processor pipeline to issue the trigger may be a wrong path event detected by the processor pipeline. The wrong path event is an event occurring during processing of instructions by the processor pipeline that provides a hint that a fetch stage of the processor pipeline may have fetched one or more instructions that do not require execution. A wrong path will for example occur when a branch predictor mispredicts the direction of a branch. However, even before the mispredicted branch instruction is executed and the misprediction thus detected, a wrong path event may indicate that a wrong path has likely occurred. Thus, a wrong path event may suggest to the prefetch circuitry that it will be able to more aggressively prefetch in the future. Such an event does not necessarily trigger a flush of the pipeline in itself, but suggests that one might occur in the near future. The prefetch circuitry can thus prepare a sequence of prefetches to take advantage of the pipeline flush when it occurs. Indeed, as discussed earlier, the degree of prefetching may be increased even before the flush occurs, for example by decreasing priority of demand requests following the receipt of the trigger to allow more aggressive prefetching.

When using a given instruction to act as an event causing the trigger to be issued, the given instruction may for example be detected by the processor pipeline at a decode stage of the processor pipeline. The decode stage can thus decode an instruction, identify what type of instruction it is and issue a trigger to the prefetch circuitry if the instruction is of a particular type. In this way, the present technique does not need to wait for the given instruction to be executed, this enabling the degree of prefetching to be increased earlier than would be the case if execution of the instruction were awaited.

To allow even earlier detection of such trigger events, some examples provide early detection circuitry referenced during a fetch stage of the processor pipeline to store an indication of the given instruction to enable the fetch stage to generate the trigger before the given instruction has been decoded by the decode stage of the processor pipeline. This early detection circuitry could for example act as a pre-decode stage to decode only a subset of the bits of the instruction in order to determine what type of instruction it has encountered, and then use this information to trigger the prefetch circuitry. Alternatively, the early detection circuitry could just maintain a record of program counter values of the instructions of interest and use that to detect when one of the instructions of interest has been fetched. By using such early detection circuitry, this gives the prefetch circuitry even more time to prefetch information into the appropriate cache as the predecode stage is earlier in the processing pipeline than the decode stage. Thus, a more aggressive level of prefetching can be activated even earlier, based on the expected drop in demand requests.

As discussed earlier, whilst the techniques described herein may be used with any suitable cache structure, in one example implementation the cache structure may be a front end cache structure which is used in connection with instruction fetch activity of the processor pipeline.

For example, the front end cache structure may be an instruction cache used to store instructions fetched from memory. It could otherwise be a translation lookaside buffer used to store virtual to physical address translation information obtained from page tables in the memory, or a branch target buffer used to identify target addresses for branch instructions. A system may have one or more instances of the prefetch circuitry according to the present technique for each of these front end structures. It may otherwise have a shared prefetch stage that can serve more than one cache structure.

Particular examples of the present technique will now be described with reference to the figures.

FIG. 1 schematically illustrates an example of a data processing apparatus 2 comprising a processing pipeline for processing instructions. The pipeline may for example include a branch predictor 4 and associated branch target buffer (BTB) 5, a fetch stage 6, a decode stage 10, a rename stage 12 and an issue stage 16. The fetch stage 6 issues fetch requests to the level 1 instruction cache (L1 I$) 8 in order to seek to retrieve instructions for execution (with lower levels of cache and/or main memory being accessed in the event of a miss in the L1 I$), the fetch stage using the output of the branch predictor to influence which instructions are fetched. The fetch stage can also reference the instruction Translation Lookaside Buffer (iTLB) 37 in order to obtain virtual to physical address translation information, as may be required for accessing one or more lower levels of cache such as the level 2 cache 32, and/or main memory 32.

The execute stage 18 may include a variety of components, for example branch circuitry 21, arithmetic logic unit (ALU) 22, floating point circuitry 24 and a load/store unit 26. The load/store unit is used to move data between caches/memory and the registers 14, and may reference a data Translation lookaside buffer (D TLB) 36 to obtain virtual to physical address translation information, and a level 1 data cache (L1 D$) 30 to access data in memory (with lower levels of cache and main memory being accessed in the event of a miss in the L1 D$). A commit stage 20 takes results of the execution stage and stores them in the registers 14. These registers are also referenced by the execute stage 18 to provide input operand values for the instructions being executed. The L1 D$ 30 and the L1 i$ 8 may reference a level 2 cache (L2 $) 32 which in turn can access lower levels of cache (not shown) and/or the main memory 34.

The prefetch circuitry associated with each of the front end caches are described below, namely the BTB prefetch circuitry 40 associated with the BTB 5, the L1 i$ prefetch circuitry 42 is associated with the L1 i$ 8 and the TLB prefetch circuitry 44 associated with the iTLB 37. The function of each instance of prefetch circuitry is described below. It will be appreciated that FIG. 1 is merely schematic and for conciseness it does not show all possible components of the processor pipeline.

Figure 2:
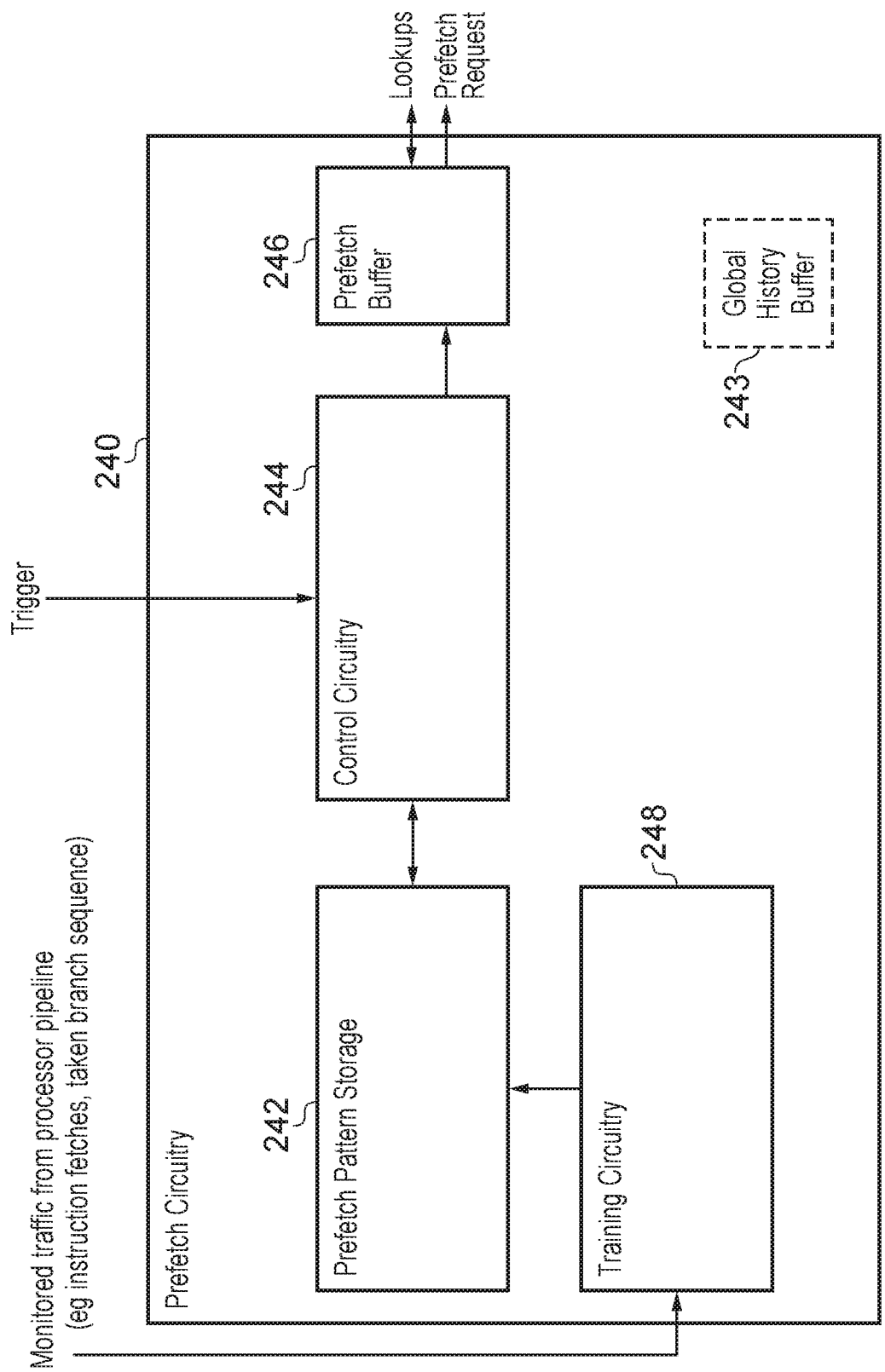
FIG. 2 schematically illustrates an example of prefetch circuitry.

FIG. 2 schematically illustrates an example of prefetch circuitry 240, which can be used to implement any of the prefetch circuits 40, 42, 44 shown in FIG. 1. According to the present technique, the processing pipeline issues a trigger to the prefetch circuitry, and it is received by the control circuitry 244. If the control circuitry can determine from the trigger that there will be a reduced demand for accesses to the associated cache by the processor pipeline, it can be arranged to make changes to how it handles prefetching in response to that trigger, for example by increasing a degree of prefetching for a period of time. The control circuitry may reference the prefetch pattern storage 242 in order to determine a sequence of prefetches to be made, and these prefetch indications can be added to entries in the prefetch buffer 246. In response to an entry in the prefetch buffer 246, the prefetch buffer can perform a lookup in the associated cache structure to determine whether the information to be prefetched (as indicated by that entry) is already resident in the cache. If it is, no further action is required, but otherwise a prefetch request can be issued from the prefetch buffer to the cache to request that the information is prefetched. The training circuitry 248 populates the pattern storage 242 with the entries necessary to associate triggers with a pattern of prefetches. An example method of training prefetch circuitry to recognise patterns is described below with reference to FIG. 7. The training circuitry is able to monitor traffic from the processor pipeline such as instruction fetches, taken branches or cache misses to determine what information should be indicated for prefetching. The prefetch circuitry may also include a global history buffer 243. Whilst the entries in the pattern storage may directly seek to identify the pattern of prefetches required, in an alternative approach the prefetch pattern storage 242 may be arranged such that each entry for a trigger indicates a pointer to the corresponding entry in the global history buffer 243. The global history buffer 243 holds a record of the sequence of addresses that have been previously accessed and can therefore be used to provide the addresses of a pattern of prefetches.

Figure 3:
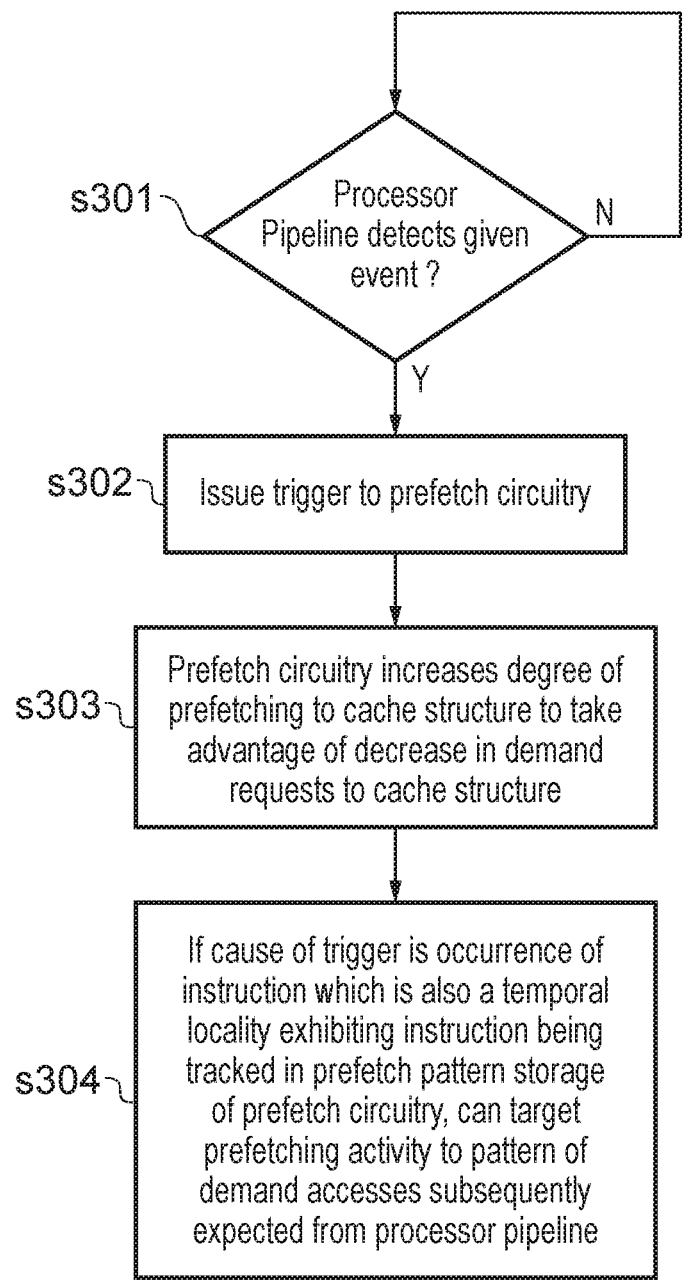
FIG. 3 shows a flow diagram illustrating steps in a method for triggering prefetches.

FIG. 3 shows a flow diagram illustrating steps in a method for triggering prefetches using the new form of trigger discussed above. At step s301 the processor pipeline waits to detect a given event that is indicative of an anticipated reduction in demand requests from the processor pipeline. Once this event has been detected, at step s302 the processing pipeline then issues a trigger to the prefetch circuitry. Then, at step s303 the prefetch circuitry increases the degree of prefetching to the cache in order to take advantage of the decrease in demand requests. At step s304, if the cause of the trigger in the processing pipeline is an occurrence of a temporal locality exhibiting instruction that is tracked in the prefetch pattern storage, then the prefetching activity can be targeted to the pattern of demand accesses that are subsequently to be expected from the processor pipeline. Otherwise the prefetch circuitry can use its normal tracking activities to determine what information to prefetch, with the above-mentioned trigger just enabling the prefetch circuitry to increase its rate of prefetching for a period of time. It should also be noted that the prefetch circuitry can also continue to respond to other standard triggers already used by prefetch circuits to trigger prefetching, such as misses occurring in the cache structure.

FIG. 4 shows an example of prefetch pattern storage for use within an instruction cache prefetcher. Each entry in the prefetch pattern storage contains an instruction ID 401 to identify the instruction covered by that entry. Typically each entry may be associated with a temporal locality exhibiting instruction, and the instruction ID may for example comprises a program counter value of such an instruction. Hence the instruction ID in an entry could for example be the program counter for an SVC or ERET instruction. For some temporal locality exhibiting instructions, the same instruction (i.e. with the same program counter value) may be called multiple times within a particular phase of execution, and the following pattern of instructions may vary dependent on which instance of the instruction is being executed. Hence the program counter may not be sufficient to fully identify the instance of the instruction in such situations, and in that case the PC value can be supplemented with additional information to identify the particular instance of the instruction. Once such instruction for which this scenario may apply is a barrier instruction for example, and the additional information may comprise some correlation information (also referred to herein as a correlation signature) obtained by the prefetch circuitry in order to identify the location of the instruction in a sequence of instructions. This correlation information could be, for example, indicative of some state information of the processing circuitry when the instruction instance to which the entry relates was executed. Whilst the state information that provides a useful signature could take a variety of forms, one example may be the content of a return address stack used by the processor pipeline.

The pattern control information field 402 stores, for each entry, an indication of at least some instructions following the identified instruction to which the entry relates, and is used to identify which instructions to prefetch when a trigger is received relating to the instruction associated with that entry. The information may indicate all of a series of instructions that were executed previously following the instruction to which the entry relates, or just a subset of them, for example those that were executed but which resulted in a miss in the instruction cache when they were requested by the fetch circuitry (and/or those that did hit in the instruction cache but only due to previous prefetching activity). The instructions identified in the prefetch control information may be indicated in a variety of forms, for example by storing their PC value, or by storing offset values relative to the PC value of the instruction to which the entry relates. As discussed earlier, in an alternative implementation, the prefetch control information may instead include a pointer to an entry in a global history buffer, with the contents of the global history buffer then being used to identify the relevant instructions to be prefetched.

Each entry may also have a confidence indication 403, to indicative of how reliable the pattern control information 402 is. Repeated detection of the stored sequence of instructions identified by the pattern control information 402 following the trigger would increase the confidence in the sequence, whereas a different observed sequence would decrease the confidence indication. It should be noted that in some implementations the confidence level may not be required, and the prefetch pattern storage could for example just maintain an indication of the most recent pattern of instructions that followed the instruction to which the entry relates. This can in some situations be a reliable and simple method of prefetching, which does not require any logic to monitor or alter the confidence indication. A valid bit 404 may also be provided in the prefetch pattern storage to indicate the validity of the entry.

Figure 5A:
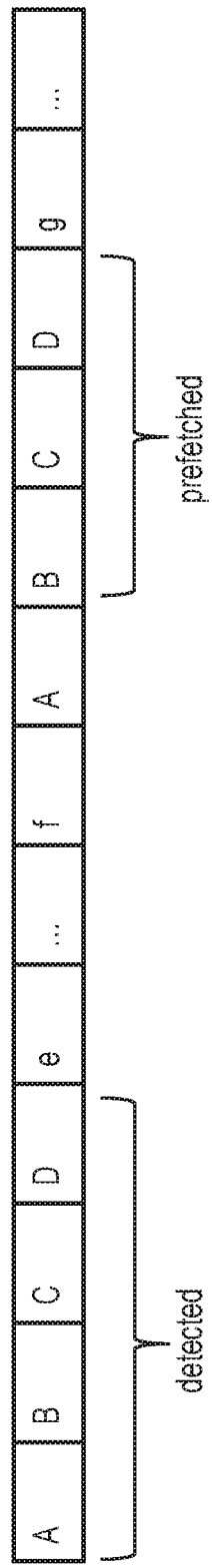
FIGS. 5A and 5B illustrate the prefetching technique employed herein with reference to an example sequence of instructions.
Figure 5B:
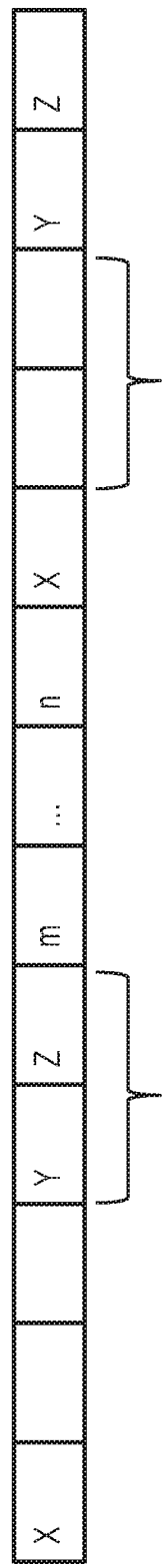

FIGS. 5A and 5B illustrate a sequence of instructions that may utilise the above-described prefetching techniques. FIG. 5A shows an example where prefetching can be used. The first time instruction A is detected, it is followed by the instructions B, C and D. This means that the next time the instruction A is detected, the instructions B, C and D can be prefetched in advance, so that they are available in the cache when the fetch stage requires them. However the ability to prefetch those instructions will depend on the bandwidth available for prefetching instructions, taking into account the demand accesses being made by the processor pipeline. FIG. 5B shows a prefetch example, where the instruction X causes the pipeline to be flushed. This is shown in the blank entries following this instruction. The next time that the instruction X is detected, the expected drop in demand can be utilised to prefetch the instructions Y and Z, so that they are available by the time the fetch circuitry makes a request for them.

FIG. 6A shows an example of prefetch pattern storage for use in an instruction Translation Lookaside Buffer prefetcher. As in FIG. 4, each entry includes an instruction ID 601, which identifies the trigger instruction to which the entry pertains, such as by reference to its program counter value, and possibly additional signature information required to identify the specific instance of the instruction to which the associated prefetch control information relates. In the case of the iTLB prefetch, the control information 602 may again indicate one or more instructions which follow the trigger instruction to which the entry relates. Then, when prefetching, that information can be used to identify which page table entries provide the required address translation information for those instructions, so that that address translation information can be prefetched into the iTLB. As above, the prefetch control information may instead comprise a pointer to an entry of a global history buffer, with the global history buffer identifying the instructions following the trigger instruction, and hence enabling a determination of the address translation information to be prefetched. As in the previous example of FIG. 4, each entry may also include a confidence indication 603 and a valid bit 604.

FIG. 6B shows an example of prefetch pattern storage for use in a Branch Target Buffer prefetcher. As per the previous examples, the storage includes an instruction ID 611 to identify the trigger instruction for the prefetch. The prefetch control information 612 for the BTB prefetch may include the offset or program counter value for one or more taken branch instructions following the trigger instruction, along with target address information for such branch instructions. Hence, as shown by way of example, the stored information may identify a taken branch instruction B0, the target address for B0 and the same information for a taken branch instruction B1 for example. As in previous examples the prefetch pattern storage may instead indicate entries in a global history buffer which in turn can be used to determine the required pattern of prefetches. The confidence indication 613 and valid bit 614 as described above may also be included in the storage 242.

Figure 7:
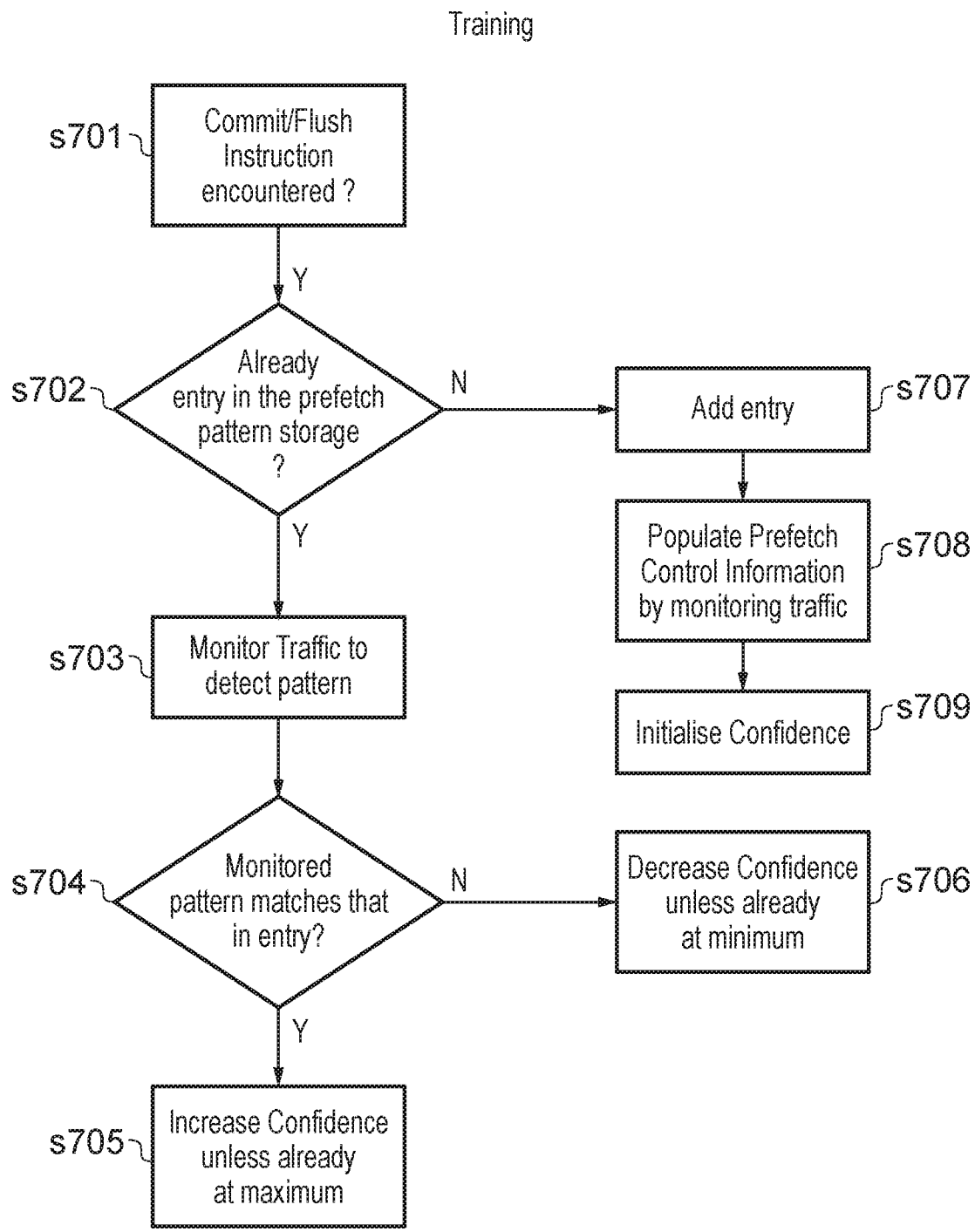
FIG. 7 shows a flow diagram illustrating steps in a method for training prefetch circuitry.

FIG. 7 shows a flow diagram illustrating steps that may be used to implement a method for training prefetch circuitry. At step s701 for example, when a commit/flush instruction is encountered the method proceeds to step s702 where a determination is made as to whether an entry already exists in the prefetch pattern storage for that instruction. If so, at step s703 fetch traffic is monitored to detect the pattern of demand accesses to the associated cache structure following the trigger instruction. For the 1$ and ITLB prefetchers 42, 44, that fetched instruction information can be used directly, whereas for the BTB prefetcher 40 that information may be used to identify which branch instructions are fetched, and then feedback information provided in due course from the branch unit 21 may be used to identify the target address for those branch instructions that are taken.

If at step s704 the monitored pattern matches that already stored in the prefetch pattern storage, then the confidence for that entry is increased (unless it is already at maximum) at step s705. If the monitored pattern does not match the stored pattern, then the confidence indication for that stored pattern is decreased, unless the indication is already at a minimum level at step s706. If at step s702 it is determined that there is no entry in the prefetch pattern storage for the commit/flush instruction, then an entry can be added at step s707. The prefetch control information in the prefetch pattern storage is then populated at step s708 by monitoring the prefetch traffic as discussed earlier with reference to step s703, and the confidence is initialised at step s709.

In another implementation, this kind of confidence based approach may not be used to train the prefetch circuitry. Instead, for example, the traffic may be monitored and the pattern stored. This way, the previous pattern to have been witnessed following the trigger instruction will be stored for use the next time the trigger instruction is encountered.

Figure 8:
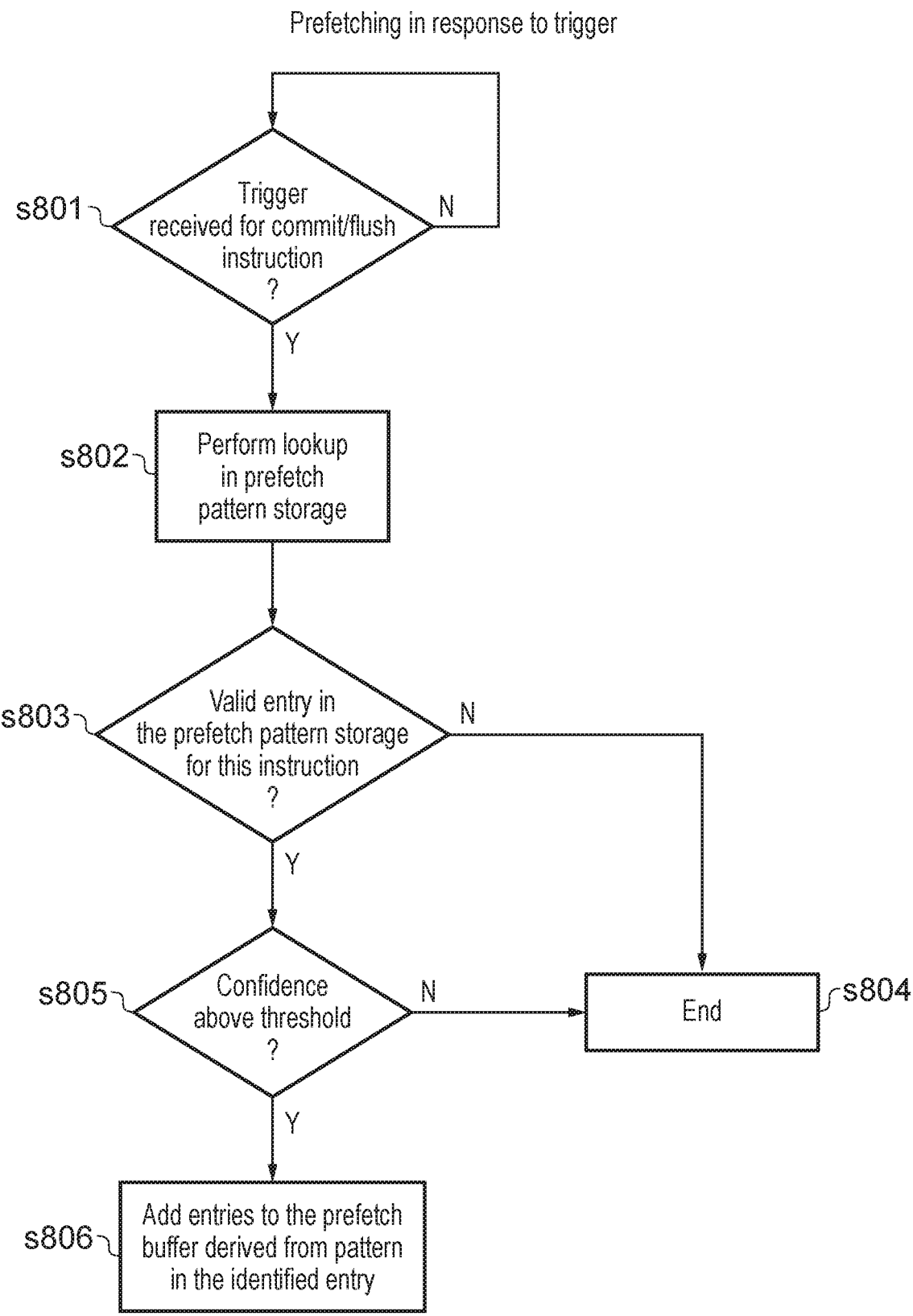
FIG. 8 shows a flow diagram illustrating steps in a method for prefetching in response to a trigger.

FIG. 8 shows a flow diagram illustrating steps in a method for prefetching in response to a trigger. At step s801 the prefetch circuitry waits to receive a trigger corresponding to a commit/flush instruction. When received, at step s802, a lookup is performed in the prefetch pattern storage. A determination is made at step s803 as to whether there is a valid entry corresponding to the instruction which caused the trigger. If not, then the method ends at step s804. The training algorithm described in FIG. 7 may be initialised at this point, or the prefetch circuitry may not respond to the trigger. If there is an entry in the prefetch pattern storage, then at step s805 another determination is made as to whether the confidence indication is above a threshold. This step may of course be omitted if the training algorithm for the prefetch circuitry does not use such a confidence based system. If at step s805 the confidence level is above the threshold, or if there is no confidence based system employed, then at step s806 the entries indicated by the prefetch pattern storage are added to the prefetch buffer. If the confidence is not above the threshold then the process proceeds to step s804.

Figure 9:
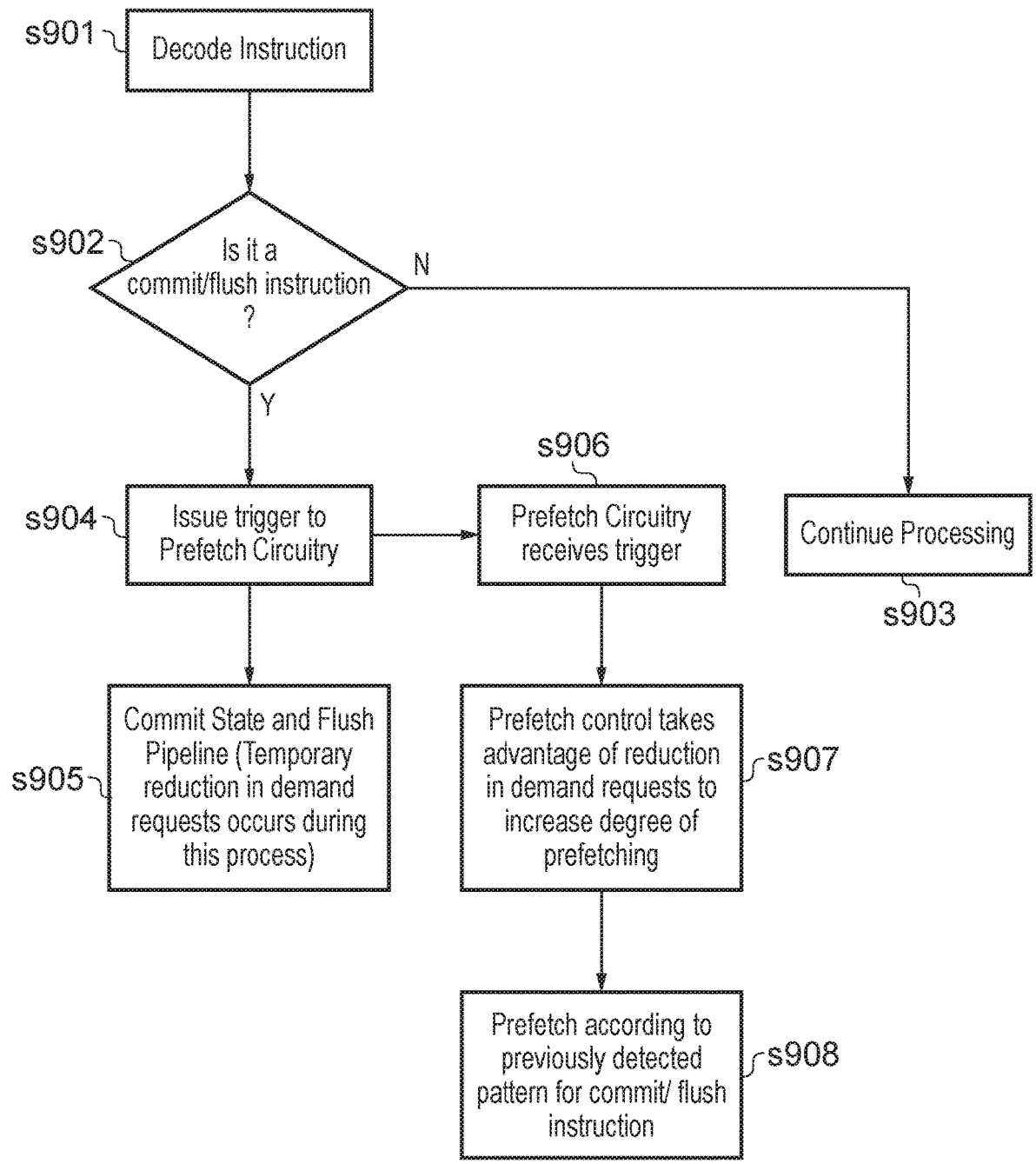
FIG. 9 shows a flow diagram illustrating steps in a method for prefetching in response to a commit/flush instruction.

FIG. 9 shows a flow diagram illustrating steps in a method for issuing triggers in response to a commit/flush instruction. At step s901 the decoder decodes an instruction. If that instruction is not determined to be a commit/flush type instruction at step s902, then processing continues as normal at step s903. If the instruction is determined to be a commit/flush type instruction, then at step s904 a trigger is issued to the prefetch circuitry. The processing circuitry then commits the results of the instructions ahead of the commit/flush instruction in the pipeline and flushes the later instructions following the commit/flush instruction from processing pipeline at step s905. A temporary reduction in demand requests occurs during this process, as a result of the flushing of the pipeline. At step s906, the prefetch circuitry receives the trigger issued by the processing circuitry at step s904. The prefetch control can then take advantage of the decrease in demands requests. The degree or agressivity of the prefetching can therefore be increased accordingly at step s907. Prefetching can therefore be carried out according to the previously detected pattern for the commit/flush instruction at step s908. This could be according to the method illustrated in FIG. 8 for example. It should be noted that in some implementations this increase in prefetching activity can begin before the commit/flush instruction is actually executed, for example by reducing priority of demand requests from the processor pipeline following receipt of the trigger due to an expectation that the pipeline will be flushed, and hence any instructions fetched as a result of those later demand requests will not actually be executed.

Figure 10:
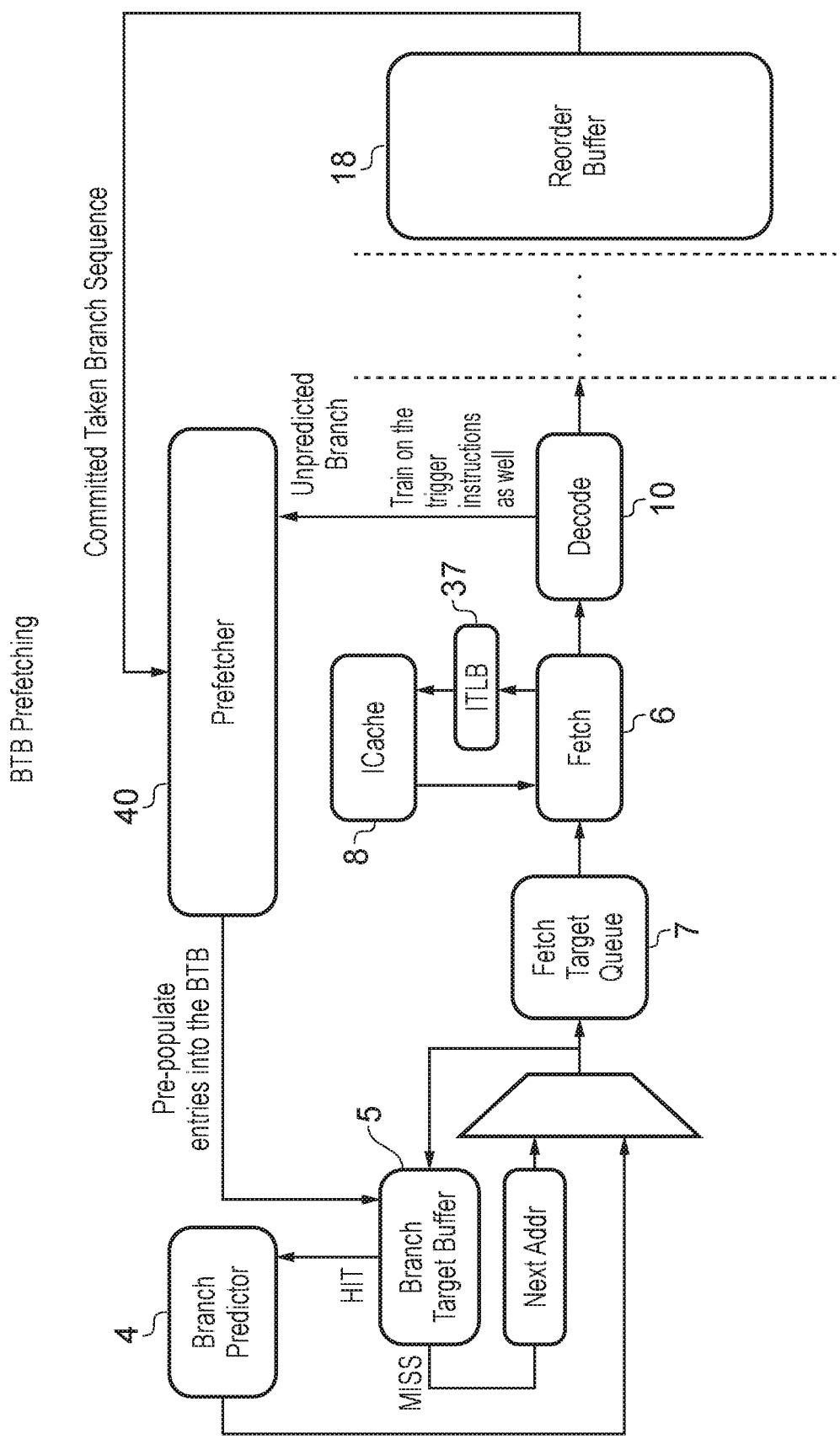
FIG. 10 schematically illustrates an example of Branch Target Buffer prefetching.

FIG. 10 schematically illustrates an example of Branch Target Buffer prefetching. In this case the prefetcher 40 populates entries in the Branch Target Buffer 5, based on information on taken branch sequences from a reorder buffer 18 and unpredicted branches that have been fetched and decoded by the decoder 10. In addition, when the early mentioned trigger instructions are detected, these can also be used to train the prefetcher, for example by creating entries in the prefetch pattern storage as discussed earlier with reference to FIG. 6B. Each block of fetched instructions is reviewed by the BTB 5, and if there is an entry in the BTB 5 (HIT) then the branch predictor 4 provides a prediction as to the next fetch target, which is used to determine the next instructions to be fetched. If there is no entry in the BTB 5, then it is assumed that the block of fetched instructions currently being considered does not include a branch instruction or that any branch instruction therein is not taken, and the next sequential address is then placed as the next fetch target in the fetch target queue 7. The fetch stage 6 issues requests for instructions to the instruction cache 8, and may use an iTLB 37 to translate virtual to physical addresses.

Figure 11:
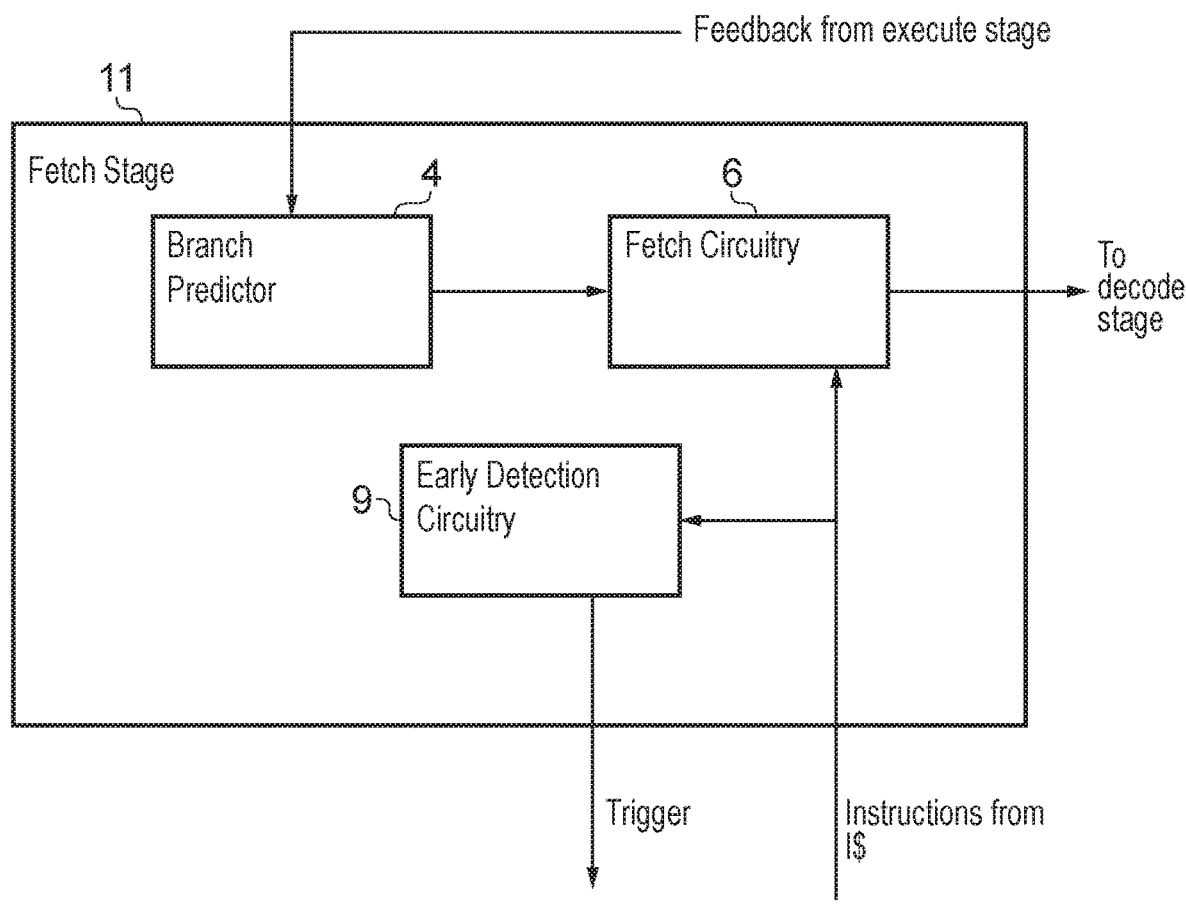
FIG. 11 schematically illustrates an example of fetch circuitry that incorporates early detection circuitry that may be used in one example implementation.

FIG. 11 schematically illustrates an example of fetch stage 11 in an alternative implementation where detection of the trigger instructions is attempted before the decode stage. The branch predictor 4 receives feedback from the execute stage as to the outcome of branch instructions, for example, and updates its internal state used to make future branch predictions. The branch prediction circuitry provides an output that is used by the fetch circuitry 6 to determine which instructions should be fetched. The fetched instructions are sent to a decode stage for example, and continue in the processing pipeline. The instructions fetched from the instruction cache may also be sent to some early detection circuitry 9. This early detection circuitry may for example take the form of a pre-decode stage that is able to partially decode the instructions which are fetched, enough to tell for example if an instruction is a commit/flush instruction. The early detection circuitry may thus be arranged to issue the trigger to prefetch circuitry, to indicate that a commit/flush instruction has been detected, and this can be used to infer that a reduction in demand requests from the processor pipeline may be expected, and that therefore the degree of prefetching can be increased. As an alternative to implementing the early detection circuitry as a pre-decode stage, the circuitry may instead merely maintain a list of PC values for the commit/flush instructions of interest, and send a trigger when an instruction having one of those PC values is fetched.

Whilst the above described examples concern the detection of certain types of instruction as the given event used to generate a trigger, such as the commit/flush instructions discussed earlier, as an alternative, or in addition thereto, the given event that causes the processor pipeline to issue the trigger may be a wrong path event detected by the processor pipeline. The wrong path event is an event occurring during processing of instructions by the processor pipeline that provides a hint that a fetch stage of the processor pipeline may have fetched one or more instructions that do not require execution. These wrong path events may not categorically identify that a wrong path has been followed (due for example to a mispredicted branch), but can give an early hint that that is likely, and hence can be used to generate the earlier discussed trigger to cause an increase in the degree of prefetching. Whilst the wrong path events can take a variety of forms, some examples of events that may indicate a wrong path are invalid memory accesses, repeated mispredictions of control flow changing instructions and exception generating arithmetic instructions. Memory operation based events may include dereferencing a null pointer, writing to an unaligned address, writing to read only pages, etc, Control flow based events may include resolving a number of branches as mispredicts whilst an earlier branch remains unresolved (the older branch is most likely a misprediction as well). Exceptions due to arithmetic instructions may include divide by zero, square root of a negative number, etc.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus, comprising:
a processor pipeline to execute instructions;
a cache structure to store information for reference by the processor pipeline when executing said instructions; and
prefetch circuitry to issue prefetch requests to the cache structure to cause the cache structure to prefetch information into the cache structure in anticipation of a demand request for that information being issued to the cache structure by the processor pipeline;
wherein:
the processor pipeline is arranged to issue a trigger to the prefetch circuitry on detection of a given event that will result in a reduced level of demand requests being issued by the processor pipeline; and
the prefetch circuitry is configured to control issuing of prefetch requests in dependence on reception of the trigger, wherein the prefetch circuitry is configured to increase a degree of prefetching upon receipt of the trigger by increasing a priority of prefetch requests relative to a priority of demand requests.

2. The apparatus according to claim 1, wherein the given event is a given instruction that, when executed, causes the processor pipeline to be emptied prior to resuming fetching of instructions from memory.

3. The apparatus according to claim 2, wherein the given instruction is a commit flush causing instruction that, when executed, causes the processor pipeline to complete execution of instructions occurring before the given instruction in order to commit the results of those instructions, and causes any instructions following the given instruction that have already been fetched from memory to be flushed from the pipeline.

4. The apparatus according to claim 3, wherein the commit flush causing instruction is at least one of:
an exception entry or exit instruction of at least one given type, and
a barrier instruction.

5. The apparatus according to claim 2, wherein the prefetch circuitry comprises prefetch pattern storage having a plurality of entries, where each entry is used to identify a temporal locality exhibiting instruction and prefetch control information used to identify a pattern of demand accesses to the cache structure that occur following that temporal locality exhibiting instruction.

6. The apparatus according to claim 5, wherein the given instruction whose detection results in the processor pipeline issuing the trigger to the prefetch circuitry is one of the temporal locality exhibiting instructions having an associated entry in the prefetch pattern storage.

7. The apparatus according to claim 6, wherein the trigger identifies location information indicative of a location of the given instruction in a sequence of instructions.

8. The apparatus according to claim 7, wherein the trigger identifies at least a program counter value of the given instruction, and each entry in the prefetch pattern storage identifies at least the program counter value of the temporal locality exhibiting instruction that is associated with that entry.

9. The apparatus according to claim 8, wherein:
the given instruction has associated therewith multiple different patterns of demand accesses to the cache structure that occur following that given instruction, where each different pattern is associated with a different instance of use of that given instruction within an instruction sequence;
the prefetch circuitry is arranged to obtain a correlation signature associated with the trigger, that is used in combination with the program counter value to identify the particular instance of use of the given instruction; and
the prefetch pattern storage is further arranged to store the correlation signature in association with the prefetch control information used to identify each different pattern of demand accesses to the cache structure identified for that given instruction.

10. The apparatus as claimed in claim 9, wherein:
the correlation signature is derived from content of a return address stack.

11. The apparatus according to claim 1, wherein the given event that causes the processor pipeline to issue the trigger is a wrong path event detected by the processor pipeline, where the wrong path event is an event occurring during processing of instructions by the processor pipeline that provides a hint that a fetch stage of the processor pipeline may have fetched one or more instructions that do not require execution.

12. The apparatus according to claim 2, wherein the given instruction is detected by the processor pipeline at a decode stage of the processor pipeline.

13. The apparatus according to claim 2, further comprising early detection circuitry referenced during a fetch stage of the processor pipeline to store an indication of the given instruction to enable the fetch stage to generate the trigger before the given instruction has been decoded by the decode stage of the processor pipeline.

14. The apparatus according to claim 1, wherein the cache structure is a front end cache structure which is used in connection with instruction fetch activity of the processor pipeline.

15. The apparatus according to claim 14, wherein the front end cache structure is at least one of:
an instruction cache used to store instructions fetched from memory;
a translation lookaside buffer used to store virtual to physical address translation information obtained from page tables in the memory;
a branch target buffer used to identify target addresses for branch instructions.

16. A method of controlling prefetching in an apparatus, the method comprising;
employing a processor pipeline to execute instructions;
storing information in a cache structure for reference by the processor pipeline when executing the instructions;
issuing prefetch requests to the cache structure to cause the cache structure to prefetch information into the cache structure in anticipation of a demand request for that information being issued to the cache structure by the processor pipeline;
issuing from the processor pipeline a trigger on detection of a given event that will result in a reduced level of demand requests being issued by the processor pipeline;
controlling the issuing of prefetch requests in dependence on reception of the trigger, wherein the controlling comprises increasing a degree of prefetching upon receipt of the trigger; and
wherein the increasing the degree of prefetching comprises increasing a priority of prefetch requests relative to a priority of demand requests.

17. An apparatus, comprising:
processing means for executing instructions;
cache means for storing information for reference by the processing means when executing said instructions; and
prefetch means for issuing prefetch requests to the cache means to cause the cache means to prefetch information into the cache means in anticipation of a demand request for that information being issued to the cache means by the processing means;
wherein:
the processing means is arranged to issue a trigger to the prefetch means on detection of a given event that will result in a reduced level of demand requests being issued by the processing means; and
the prefetch means is configured to control issuing of prefetch requests in dependence on reception of the trigger, wherein the prefetch means is configured to increase a degree of prefetching upon receipt of the trigger by increasing a priority of prefetch requests relative to a priority of demand requests.

* * * * *